(12) United States Patent
Matsushita

(10) Patent No.: US 8,835,539 B2
(45) Date of Patent: Sep. 16, 2014

(54) MANUFACTURING METHOD FOR RESIN COMPOSITION CONTAINING FINE PAPER POWDER

(75) Inventor: Takamichi Matsushita, Tokyo (JP)

(73) Assignee: Kankyokeieisogokenkyusho Co., Inc., Tokyo (JP)

( * ) Notice: Subject to any disclaimer, the term of this patent is extended or adjusted under 35 U.S.C. 154(b) by 102 days.

(21) Appl. No.: 13/361,971

(22) Filed: Jan. 31, 2012

(65) Prior Publication Data

US 2012/0329917 A1    Dec. 27, 2012

Related U.S. Application Data

(60) Provisional application No. 61/499,735, filed on Jun. 22, 2011.

(51) Int. Cl.
| | | |
|---|---|---|
| *B29B 7/00* | (2006.01) | |
| *C08L 67/04* | (2006.01) | |
| *C08L 25/06* | (2006.01) | |
| *C08L 23/12* | (2006.01) | |
| *C08L 23/06* | (2006.01) | |
| *C08J 5/04* | (2006.01) | |
| *B29C 47/60* | (2006.01) | |
| *B29C 47/64* | (2006.01) | |
| *C08K 11/00* | (2006.01) | |
| *B29K 511/12* | (2006.01) | |
| *B29K 67/00* | (2006.01) | |
| *B29C 47/76* | (2006.01) | |
| *B29C 47/00* | (2006.01) | |
| *B29K 311/12* | (2006.01) | |

(52) U.S. Cl.
CPC .............. *C08J 5/045* (2013.01); *B29K 2511/12* (2013.01); *B29K 2067/046* (2013.01); *B29C 47/767* (2013.01); *B29C 47/6012* (2013.01); *B29C 47/60* (2013.01); *B29C 47/64* (2013.01); *B29C 47/0009* (2013.01); *C08K 11/005* (2013.01); *B29C 47/6031* (2013.01); *B29K 2311/12* (2013.01); *B29C 47/0004* (2013.01)
USPC .............................................. 524/34; 366/84

(58) Field of Classification Search
None
See application file for complete search history.

(56) References Cited

U.S. PATENT DOCUMENTS

| 5,340,646 A | 8/1994 | Morita et al. | |
|---|---|---|---|
| 2012/0190775 A1* | 7/2012 | Yasuda et al. | 524/9 |

FOREIGN PATENT DOCUMENTS

| JP | 10-138241 | 5/1998 |
|---|---|---|
| JP | 2001-181511 | 7/2001 |

(Continued)

OTHER PUBLICATIONS

Machine translation of JP 2001-181511 (which was provided by Applicant).*

(Continued)

*Primary Examiner* — Ling Choi
*Assistant Examiner* — Catherine S Branch
(74) *Attorney, Agent, or Firm* — Paul A. Guss

(57) ABSTRACT

A resin composition containing fine paper powder used in molding is obtained by using a non-intermeshing type counter-rotating twin-screw kneading extruder (10) having rotor units (11*b*, 12*b*) disposed in at least a part of screws (11, 12), respectively, to knead a raw material containing a fine paper powder of an average particle diameter of 10 to 100 μm from 20 to 70 parts by weight, and a thermoplastic resin from 30 to 80 parts by weight, with a sum of the fine paper powder and the thermoplastic resin being 100 parts by weight, at a temperature of no more than 210° C.

5 Claims, 2 Drawing Sheets

(56) References Cited

FOREIGN PATENT DOCUMENTS

| | | |
|---|---|---|
| JP | 2005-035134 | 2/2005 |
| JP | 2011-021087 | 2/2011 |
| WO | 00/78127 | 12/2000 |
| WO | WO 2011007550 A1 * | 1/2011 |

OTHER PUBLICATIONS

Osswald et al., Polymer Processing—Modeling and Simulation, p. 133 (2006).*

HTM Twin Screw Continuous Kneading Extruder, Jul. 5, 2010.*

* cited by examiner

US 8,835,539 B2

MANUFACTURING METHOD FOR RESIN COMPOSITION CONTAINING FINE PAPER POWDER

BACKGROUND OF THE INVENTION

1. Field of the Invention

The present invention relates to a manufacturing method for manufacturing a resin composition containing fine paper powder in which fine paper powder is evenly dispersed and contained in resin.

2. Description of the Related Art

Nowadays, large amounts of waste paper are discarded from offices, publication houses, paper manufacturing companies and the like. In general, at a stage during manufacturing of paper from wood or the like, paper is subjected to a high degree of processing in order to render cellulose fibers finely softened, such that paper is a functional material having a value-added structure. Therefore, waste paper is originally a functional material having a value-added structure. Moreover, waste paper is a material that is effectively zero in terms of its environmental impact. Consequently, proposals have been made for using resin compositions containing paper, in which pulverized waste paper is mixed, for molding process materials.

For example, in Japanese Patent Laid-open No. 10-138241, there has been disclosed a resin pellet containing paper in which a composite paper having a polyethylene resin layer on at least one surface thereof is shredded into shredded paper components of about 1 mm to 5 mm square, and the shredded paper components are mixed at 50% by weight or greater with a synthetic resin component of polyethylene or the like to yield the resin pellet containing paper.

In Japanese Patent Laid-open No. 2001-181511, there has been disclosed a resin composition containing paper for use in molding processes, which contains in excess of 50% by weight and at or below 70% by weight of a low combustion heat component in powder form consisting mainly of paper powder and having a particle diameter of 50 µm or greater and 200 µm or less made by grinding waste paper or the like, and 30% or more by weight and less than 50% by weight of a high combustion heat component made up mainly from a thermoplastic resin.

However, paper having no fluidity disrupts the smooth flow of molten resins. Therefore, whether the resin pellet containing paper disclosed in Japanese Patent Laid-open No. 10-138241 or the resin composition containing paper for use in molding processes disclosed in Japanese Patent Laid-open No. 2001-181511 is used to produce a complex molded article by injection molding, defects such as filling failures occur easily, and transferability is also deteriorated, which makes it impossible to obtain molded products of a high quality.

SUMMARY OF THE INVENTION

The present invention has been accomplished in view of the aforementioned problems, and it is therefore an object of the present invention to provide a manufacturing method for a resin composition containing fine paper powder capable of obtaining the resin composition containing fine paper powder as a good molding process material which exhibits a good fluidity.

The manufacturing method of the present invention manufactures a resin composition containing fine paper powder used in molding by using a non-intermeshing type counter-rotating twin-screw kneading extruder having a rotor unit disposed in at least a part of a screw to knead a raw material containing a fine paper powder having an average particle diameter of 10 to 100 µm from 20 to 70 parts by weight, a thermoplastic resin from 30 to 80 parts by weight, with a sum of the fine paper powder and the thermoplastic resin being 100 parts by weight, at a temperature of no more than 210° C.

According to the manufacturing method of the resin composition containing fine paper powder of the present invention, the obtained resin composition containing fine paper powder contains fine paper powder of extremely small average particle diameter of 10 to 100 µm, it is possible for it to be a good material having excellent transferability in molding. However, if the raw material is kneaded by using the conventional intermeshing type twin-screw kneading extruder, fine paper powder which has no fluidity aggregates during the kneading, and in turn is mixed unevenly with resin.

Therefore, in the present invention, a non-intermeshing type counter-rotating twin-screw kneading extruder having a rotor unit disposed in at least a part of a screw, namely Banbury type mixer (registered trademark) which is a sealed kneading machine, is used to knead the raw material. Thereby, the raw material is strongly mixed by the Banbury type mixer and thereafter is released out from a gap in the non-intermeshing type rotor structure, and the mixing and releasing operations are repeated. Due to the repeated mixing and releasing operations on the mixture by the rotors, the fine paper powder is evenly dispersed and mixed with the resin without aggregation.

Moreover, compared to the conventional complete intermeshing type twin-screw kneading extruder, it is possible to inhibit increase of the kneading temperature of the mixture. According to the present invention, the raw material can be kneaded at a temperature of 210° C. at most or lower. Thereby, it is possible to prevent the obtained resin composition containing fine paper powder from having yellow discoloration or having a burnt smell occurred due to the thermal degradation of paper components.

According to the present invention, the non-intermeshing type counter-rotating twin-screw kneading extruder is provided with two screws, the rotor unit disposed in one screw has a cross section which is orthogonal to the central axis of the screw and has the minor axis and the major axis orthogonal to each other and has the same cross section as the rotor unit disposed in the other screw, the two screws are disposed in such a way that the major axis of the rotor unit disposed in one screw will not enter into a rotation area surrounding the major axis of the rotor unit disposed in the other screw, and the two screws are configured to rotate in counter direction with the major axis of the rotor unit disposed in one screw orthogonal to the major axis of the rotor unit disposed in the other screw.

In the manufacturing method of the resin composition containing fine paper powder of the present invention, it is preferable that the thermoplastic resin is polyolefin resin, polystyrene resin, or polylactic resin. In addition, it is preferable that the polyolefin resin is polyethylene, polypropylene, or a mixture thereof.

In the manufacturing method of the resin composition containing fine paper powder of the present invention, it is preferable that the raw material contains a compound having a maleic anhydride group from 0.3 to 5 parts by weight. Thereby, it is possible to improve the physical properties of the obtained resin composition containing fine paper powder.

The resin composition containing fine paper powder of the present invention can be used as an ideal material for molding a molded article by injection molding, extrusion molding or the like.

DETAILED DESCRIPTION OF THE PREFERRED EMBODIMENTS

Figure 1:
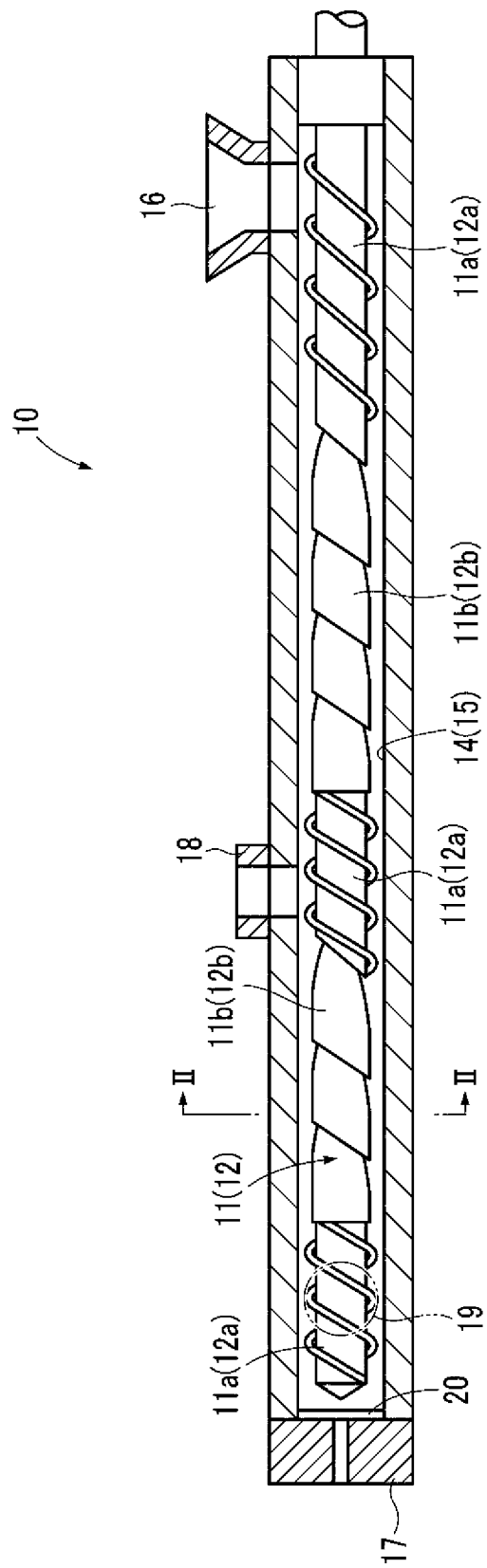
FIG. 1 is a schematic view illustrating a kneading extruder used in a manufacturing method of a resin composition containing fine paper powder according to an embodiment of the present invention.

A manufacturing method of a resin composition containing fine paper powder according to an embodiment of the present invention will be described hereinafter.

The raw material used in the manufacturing method of a resin composition containing fine paper powder contains a fine paper powder which is obtained by pulverizing paper scraps, pulp sheet scraps and the like into a powder having an average particle diameter of 10 to 100 µm from 20 to 70 parts by weight, and a resin material comprising thermoplastic resin in pellet form, powder form and the like from 30 to 80 parts by weight. A sum of the fine paper powder and the thermoplastic resin is 100 parts by weight. The pulverization method for pulverizing the paper scraps, the pulp sheet scraps ant the like is not limited, for example, the pulverization may be performed by using a vertical roller mill, a herb mill or the like.

The average particle diameter is measured by using a laser diffraction-scattering type particle size distribution measuring instrument LMS-350 made by SEISHIN Enterprise Co. Ltd.

In the case that the average particle diameter of the fine paper powder is greater than 100 µm, it is highly possible that the fine paper powder aggregates in kneading, which in turn deteriorates the fluidity of molten resin and reduces the strength of the obtained resin composition containing fine paper powder. On the contrary, in the case that the average particle diameter of the fine paper powder is less than 10 µm, the fluidity and the strength will become better; however, it would be extremely difficult to manufacture the fine paper powder, which makes the manufacturing cost rise significantly.

In the case where the sum of the fine paper powder and the thermoplastic resin is 100 parts by weight, when the fine paper powder is greater than 70 parts by weight or the resin material is less than 30 parts by weight, the fine paper powder having no fluidity occupies the major part of the raw material, which in turn deteriorates the fluidity of the mixture and reduces the strength of the obtained resin composition containing fine paper powder. Moreover, since the major part of the obtained resin composition containing fine paper powder is of paper components, the strength thereof becomes low and fragile.

On the other hand, when the fine paper powder is less than 20 parts by weight or the resin material is greater than 80 parts by weight, the heat-resistant softening properties of the obtained resin composition containing fine paper powder will be degraded. Moreover, in this case, functional expressions of the paper components are suppressed, such as the ability to absorb warping during the molding of the resin composition containing fine paper powder based on a flexible structure of the fine paper powder, and environmental performance will be degraded as well.

It is preferable that the fine paper powder is obtained by pulverizing waste papers into fine powder. Such waste papers typically are discarded in great amounts from offices, publishing houses, paper manufacturing companies and the like, and are valued as having a substantially zero negative effect on the environment. The waste papers include various types of waste papers, for example, old newspapers, old magazines, waste printed papers, used wrapping papers, discarded cardboard boxes, old office paper, etc., broken and damaged sheets that occur upon manufacturing of virgin paper, cutting wastage from magazines and the like, grinding powders, shredder scraps, etc. It is acceptable that the fine paper powder is made by pulverizing pulp sheets into fine powder.

It is acceptable that the resin material is a thermoplastic resin; however, it is preferable that the resin material is polyolefin resin, polystyrene resin, or polylactic resin.

As an example of the polyolefin resin, polypropylene, polyethylene, or a mixture thereof may be given. As the polypropylene, polypropylene block polymer, polypropylene random polymer, polypropylene homopolymer, metallocene-catalyzed polypropylene polymer, catalloy process polypropylene, modified polypropylene or the like may be used. As the polyethylene, low-density polyethylene, linear low-density polyethylene, intermediate density polyethylene, high-density polyethylene, metallocene-catalyzed polyethylene, modified polyethylene, ethylene vinyl acetate (EVA) or the like may be used.

As an example of the polystyrene resin, PS resin (polystyrene resin), AS resin (acrylonitrile-styrene copolymer synthetic resin), ABS resin (acrylonitrile-butadiene-styrene copolymer synthetic resin), or the like may be given.

In order to modify the resin composition containing fine paper powder, it is acceptable to add the other types of resins, rubber, thermoplastic Elastomer and the like by 20 or less parts by weight into the raw material.

It is acceptable to add the additive from 0.3 to 5 parts by weight into the raw material where necessary. An antioxidant, a lubricant, a deodorant, a bleaching agent, a coloring agent, for example, may be added as the additive.

Particularly, a resin modifying agent is preferably contained therein. The resin modifying agent is a compound having a maleic anhydride group, such as maleic acid modified polyolefin, olefin-maleic anhydride copolymer, maleic acid modified wax, and maleate modified wax. Such resin modifying agents mix well with the resin material, in particular poly olefin resins, to introduce polar groups, thereby enhancing compatibility between the fine paper powder and the resin material and improving dispersibility.

A phenolic antioxidant, a phosphorous antioxidant and a sulfur antioxidant, for example, may be used as the antioxidant. Primary amide, secondary amide, ethylene-bis-amide, metal stearate, and metal hydroxystearate, for example, may be used as the lubricant.

An inorganic filling agent, such as titanium oxide, talc, calcium carbonate, calcium sulfate, barium sulfate, gypsum, clay and the like, may be added to the raw material where necessary.

In the manufacturing method of a resin composition containing fine paper powder according to an embodiment of the present invention, the kneading extruder is used to knead the raw material at a temperature of no more than 210° C. to yield the resin composition containing fine paper powder for molding.

Hereinafter, with reference to FIG. 1 and FIG. 2, the kneading extruder 10 used in an embodiment of the present invention is described.

The kneading extruder 10 is a non-intermeshing type counter-rotating twin-screw kneading extruder. Two screws 11 and 12 are rotatably disposed in cross-sectionally circular shaped tunnels 14 and 15 formed in a casing 13 in parallel. As illustrated in FIG. 2, the two screws 11 and 12 are configured to rotate inward in counter direction by a driving device (not shown) disposed outside the casing 13.

An upstream end portion of the casing 13 is formed with a material feeding port 16 communicating with both the tunnel 14 and the tunnel 15. The raw material containing the fine paper powder and the resin material is fed into the tunnels 14 and 15 via the material feeding port 16 by a feeder (not shown) disposed outside the casing 13.

Although not shown in the drawings, a heater is disposed surrounding the casing 13 for heating the raw material flowing in the tunnels 14 and 15 to a temperature of no more than 210° C.

The raw material in the tunnels 14 and 15 is heated by the heater to rise from the room temperature. While the fine paper powder is being mixed with the semi-molten or molten resin material, it is transferred sequentially by the two screws 11 and 12 from the upstream side to a die 17 connected to the downstream end. Then, the resin composition containing fine paper powder in softening state is extruded to the outside from the exit of the die 17 in sheet shape. However, the fine paper powder is neither semi-molten nor molten.

The two screws 11 and 12 are of a non-intermeshing type having a clearance therebetween. Each screw 11 or 12 is disposed with a screw unit 11a or 12a with a screw groove formed in the outer circumferential surface. A part of each screw 11 or 12 is formed into a rotor unit 11b or 12b. As illustrated in the drawing, each of the screws 11 and 12 is provided with a plurality of the screw units 11a or 12a and a plurality of the rotor unit 11b or 12b which are alternatively disposed in the longitudinal direction. In the present embodiment, each of the screws 11 and 12 is provided with 3 screw units 11a or 12a and 2 rotor units 11b or 12b.

The screw units 11a and 12a transfer the raw material fed from the material feeding port 16 through the tunnels 14 and 15, respectively, to the downstream side.

Figure 2:
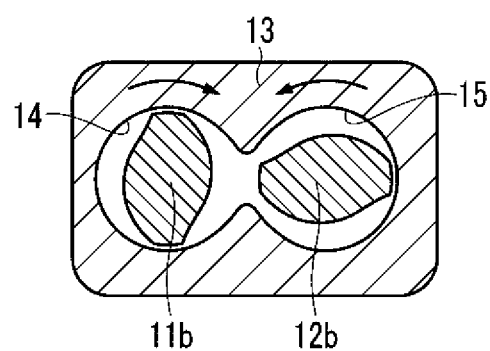
FIG. 2 is a cross sectional view cut along the II-II line of FIG. 1.

As illustrated in FIG. 2, the tunnels 14 and 15 communicate with each other at the portions in the tunnels 14 and 15 where the rotor units 11b and 12b are disposed inside. The clearance between the maximum outer diameter of each of the rotor units 11b and 12b and the internal surface of the tunnels 14 and 15 is set to a narrow one. Thereby, the raw material such as the resin material is compressed, mashed, released and mixed with the fine paper powder by adjacent rotor units 11b and 12b and the tunnels 14 and 15 housing therein the rotor units.

Specifically, each of the rotor units 11b and 12b has an identical cross-sectional shape orthogonal to the central axis. The section has a minor diameter in a predefined direction and a major diameter orthogonal to the minor diameter. The rotor units 11b and 12b are disposed without intermeshing each other that the major axis of one rotor unit will not enter into a rotation area surrounding the major axis of the other rotor unit. The two screws 11 and 12 are configured to rotate in counter direction with the major axes of the rotor units orthogonal to each other.

The raw material such as the resin material is kneaded in a Banbury type mixer (registered trademark) through continuous steps of compressing, mashing and releasing between the outer circumferential surfaces of the rotor units 11b and 12b rotating at high speed and the internal circumferential surfaces of the tunnels 14 and 15. Thereby, the fine paper powder which will not melt can be evenly dispersed in the molten resin and mixed therewith out aggregation.

In the case that a conventional intermeshing type twin-screw kneading extruder is used, the raw material is compressed, sheared, and then molten and kneaded between completely intermeshing kneading units of a disc shape. When it is working at a high speed, a great amount of heat will be generated, which makes the mixture to a high temperature. Thereby, the paper components undergo thermal degradation, having yellow discoloration or an unpleasant smell. However, if it is working at a low speed, the production efficiency decreases.

However, in the kneading extruder 10 of the present invention, the raw material is compressed, mashed and released at a relatively short time, and is always released in the clearances of the non-intermeshing type rotor units 11b and 12b, respectively. Thereby, compared with the conventional intermeshing type twin-screw kneading extruder, the temperature can be lowered by 10 to 20° C. Thus, it is possible to knead the raw material at a relatively low temperature of no more than 210° C., which makes it possible to prevent the resin composition containing fine paper powder from having yellow discoloration or having a burnt smell due to the thermal degradation of paper components.

Since the two screws 11 and 12 are of the non-intermeshing type, it is possible for them to rotate at a high speed; moreover, the two screws 11 and 12 are of the Banbury mixer type, superior in kneading ability. Thereby, compared to the conventional intermeshing type twin-screw kneading extruder, the kneading extruder 10 has a greater discharge rate, superior in production efficiency.

The fine paper powder has a very small volume density, contains a large amount of air and water moisture so that, when it is heated, it releases a large amount of water vapor. The other materials such as the resin material and the like also contain therein air and water moisture. In order to degas the gases such as air, water moisture and the like therefrom, an open vent 18 is disposed in the casing 13 in communication with the tunnels 14 and 15. The gases such as air, water moisture and the like generated in kneading are released out to the atmosphere from the open vent 18.

A downstream portion of the casing 13 is disposed with a vacuum degassing vent 19 in communication with the tunnels 14 and 15. The vacuum degassing vent 19 is connected by a vacuum pump (not shown). The gases such as air, water moisture and the like generated in kneading or the like are forcibly pumped out via the vacuum degassing vent 19.

The gases such as air, water moisture and the like can be satsifactorily degassed via the vents 18 and 19, it is possible to prevent water moisture from being absorbed by the fine paper powder of a very high hygroscopicity and the gases such as air, water moisture and the like from being contained in the obtained resin composition containing fine paper powder. Thereby, it is possible to improve the quality of the obtained resin composition containing fine paper powder and the discharge rate thereof as well.

The downstream ends of the tunnels 14 and 15 are configured to communicate with a discharge opening 20 formed in the casing 13. The downstream side of the discharge opening 20 is connected with the die 17 having a slit-shaped exit. The resin composition containing fine paper powder is extruded out from the die 17 into a sheet shape.

The resin composition containing fine paper powder extruded from the kneading extruder 10 in a sheet shape is received by a cooling receiver (not shown) provided with a plurality of rollers, cooled and solidified while being drawn by the rollers, and wound up by a sheet winder.

The resin composition sheet containing fine paper powder obtained as mentioned above is superior in tensile strength, extensibility and the like, thereby, is a good molding material. In addition, the sheet is made of resin containing fine paper powder having an average particle diameter of 10 to 100 μm, which is superior in transferability; if it is molded, it is possible to obtain a molded article of high quality.

In addition to the sheet shape, the resin composition containing fine paper powder may be formed into a pellet shape as well. In this case, the die 17 having a round pore is connected to the downstream side of the discharge opening 20. The resin composition containing fine paper powder in softening state is extruded out from the die 17 in a cylindrical shape, solidified in a tank of water, cut by a cutting machine to form into the pellet shape. It is acceptable to use a hot-cut type pellet manufacturing machine as well. It is also acceptable to use the manufactured pellets to form the resin composition containing fine paper powder into the sheet shape or the like.

It is possible to mold the resin composition containing fine paper powder which has been formed into the sheet shape, the pellet shape or the like into a desired molded article according to molding processes such as injection molding, blow molding, inflation molding, vacuum molding, compression molding, molten compression molding, press molding and the like.

The present invention is not limited to the above embodiment, it should be understood that other possible modifications and variations made without departing from the spirit and scope of the present invention will be comprised in the present invention.

EXAMPLES

Hereinafter, detailed examples of the present invention will be specifically given to describe the present invention.

Examples 1-7 and Comparative Example 1

In Examples 1-7 and Comparative example 1, a raw material was prepared to contain fine paper powder of an average particle diameter of 10 μm, 30 μm, 50 μm and 100 μm at parts by weight listed in Table 1, polypropylene (MA-03 made by Japan Polypropylene Corporation) at parts by weight listed in Table 1, polyethylene (UF-421 made by Japan Polyethylene Corporation) at 10 parts by weight, an anti-oxidizing agent (ADK STAB AO-60 made by ADEKA Corporation) at 1 part by weight, and calcium stearate at 1 part by weight. The average particle diameter of the fine paper powder was measured by using a laser diffraction-scattering type particle size distribution measuring instrument LMS-350 made by SEISHIN Enterprise Co. Ltd.

The raw material was extruded into the sheet shape by using the kneading extruder 10 mentioned above. Melt flow rates (MFR) for the obtained resin compositions containing fine paper powder were measured according to a specified measuring method in JIS K7210. Izod impact values for the obtained resin compositions containing fine paper powder were measured were measured according to Izod impact test. The measured values were recorded in respective columns of Table 1.

It is obviously shown in Table 1 that, in Examples 1-7, when a raw material containing a fine paper powder of an average particle diameter of 10 to 100 μm from 20 to 70 parts by weight, and polypropylene and polyethylene in total from 30 to 80 parts by weight was used, the obtained resin composition containing fine paper powder has a good fluidity with a melt flow rate of 1.1 to 15 gr/10 min and a good strength with an Izod impact value of 2.1 to 12 KJ/m$^2$, which is no fragile.

On the other hand, in Comparative example 1, when a raw material containing 80 parts by weight of fine paper powder of an average particle diameter of 50 μm and 20 parts by weight of polypropylene and polyethylene in total was used, the obtained resin composition containing fine paper powder has a low fluidity with a melt flow rate of 0.1 gr/10 min and is fragile with an Izod impact value of 0.5 KJ/m$^2$.

TABLE 1

|  |  | Example 1 | Example 2 | Example 3 | Example 4 | Example 5 | Example 6 | Example 7 | Comparative Example 1 |
|---|---|---|---|---|---|---|---|---|---|
| fine paper powder | average particle diameter (μm) | 10 | 30 | 50 | 100 | 50 | 50 | 50 | 50 |
|  | (part by weight) | 50 | 50 | 50 | 50 | 20 | 30 | 70 | 80 |
| polypropylene (part by weight) |  | 40 | 40 | 40 | 40 | 70 | 60 | 20 | 10 |
| polyethylene (part by weight) |  | 10 | 10 | 10 | 10 | 10 | 10 | 10 | 10 |
| anti-oxidizing agent (part by weight) |  | 1 | 1 | 1 | 1 | 1 | 1 | 1 | 1 |
| lubricant (part by weight) |  | 1 | 1 | 1 | 1 | 1 | 1 | 1 | 1 |
| melt flow rate (gr/10 min) |  | 15 | 9.1 | 3.5 | 1.1 | 15 | 9.5 | 1.7 | 0.1 |
| Izod impact value (KJ/m$^2$) |  | 12 | 7.1 | 3.5 | 2.1 | 10 | 3.5 | 2.5 | 0.5 |

Examples 8, 9 and Comparative Examples 2, 3

In Examples 8, 9 and Comparative examples 2, 3, a raw material was prepared to contain fine paper powder of an average particle diameter of 50 μm at parts by weight listed in Table 2, polypropylene (MA-03 made by Japan Polypropylene Corporation) at parts by weight listed in Table 2, polyethylene (UF-421 made by Japan Polyethylene Corporation) at 10 parts by weight, an anti-oxidizing agent (ADK STAB AO-60 made by ADEKA Corporation) at 1 part by weight, and calcium stearate at 1 part by weight. Thus, the raw material in Example 8 is the same as the raw material in Comparative example 2, and the raw material in Example 9 is the same as the raw material in Comparative example 3. The average particle diameter of the fine paper powder was measured by using the laser diffraction-scattering type particle size distribution measuring instrument LMS-350 made by SEISHIN Enterprise Co. Ltd.

In Examples 8 and 9, the raw material was extruded into the sheet shape by using the kneading extruder 10 mentioned above. In Comparative examples 2 and 3, the raw material was extruded into the sheet shape by using a conventional intermeshing type co-rotating twin-screw kneading extruder having a kneading disc unit.

For both of the kneading extruders, the diameter of the rotor unit or the kneading disc unit is 50 mm, the ratio of the total length with respect to the diameter of the screw is 44, the rotation speed of the screw is 150 rpm, and the predefined temperature of the tunnel is 180 to 190° C.; and both of the kneading extruders are all provided with one open vent and one vacuum degassing vent.

The discharge rate and the highest temperature of the resin composition containing fine paper powder discharged from the kneading extruders were measured. The measured values were recorded in respective columns of Table 2. In addition, whether yellow discoloration is present or not in the obtained resin composition sheets containing fine paper powder was observed visually. The observation results were recorded in respective columns of Table 2.

It is obviously shown in Table 2 that, in Examples 8 and 9 where the kneading extruder 10 was used, the discharge rates were as high as 125 kg/hr and 83 kg/hr, respectively, denoting good production efficiency.

However, in Comparative examples 2 and 3 where the conventional intermeshing twin-screw kneading extruder was used, the discharge rates were as low as 58 kg/hr and 38 kg/hr, respectively, denoting worse production efficiency.

Moreover, in Examples 8 and 9 where the kneading extruder 10 was used, the highest temperatures were 205° C. and 210° C., respectively, equal to or lower than 210° C., and there is no yellow discoloration occurred in the obtained resin composition containing fine paper powder.

On the other hand, in Comparative examples 2 and 3 where the conventional intermeshing twin-screw kneading extruder was used, the highest temperatures were 220° C. and 230° C., respectively, greater than 210° C., and yellow discoloration occurred in the obtained resin composition containing fine paper powder.

TABLE 2

|  | Example 8 | Example 9 | Comparative Example 2 | Comparative Example 3 |
|---|---|---|---|---|
| kneading extruder | non-intermeshing type counter-rotating twin-screw | | intermeshing type co-rotating twin-screw | |
| fine paper powder average particle diameter (μm) | 50 | 50 | 50 | 50 |
| fine paper powder (part by weight) | 30 | 50 | 30 | 50 |
| polypropylene (part by weight) | 60 | 40 | 60 | 40 |
| polyethylene (part by weight) | 10 | 10 | 10 | 10 |
| anti-oxidizing agent (part by weight) | 1 | 1 | 1 | 1 |
| lubricant (part by weight) | 1 | 1 | 1 | 1 |
| discharge rate (kg/hr) | 125 | 83 | 58 | 38 |
| highest temperature (° C.) | 205 | 210 | 220 | 230 |
| yellow discoloration | negative | negative | positive | positive |

What is claimed is:

1. A manufacturing method for manufacturing a resin composition containing fine paper powder used in molding by using a non-intermeshing type counter-rotating twin-screw kneading extruder having a rotor unit disposed in at least a part of a screw to knead a raw material containing a fine paper powder having an average particle diameter of 10 to 30 μm from 20 to 70 parts by weight, a thermoplastic resin from 30 to 80 parts by weight, and calcium stearate at 1 part by weight, with a sum of the fine paper powder, the thermoplastic resin, and the calcium stearate being 100 parts by weight, at a temperature of no more than 210° C., wherein:
the non-intermeshing type counter-rotating twin-screw kneading extruder is provided with two screws;
the rotor unit disposed in one screw has a cross section which is orthogonal to the central axis of the screw and has the minor axis and the major axis orthogonal to each other and has the same cross section as the rotor unit disposed in the other screw;
the two screws are disposed in such a way that the major axis of the rotor unit disposed in one screw will not enter into a rotation area surrounding the major axis of the rotor unit disposed in the other screw; and
the two screws are configured to rotate in counter direction with the major axis of the rotor unit disposed in one screw orthogonal to the major axis of the rotor unit disposed in the other screw.

2. The manufacturing method for manufacturing the resin composition containing fine paper powder according to claim 1, wherein the thermoplastic resin is polyolefin resin, polystyrene resin, or polylactic resin.

3. The manufacturing method for manufacturing the resin composition containing fine paper powder according to claim 2, wherein the polyolefin resin is polyethylene, polypropylene, or a mixture thereof.

4. The manufacturing method for manufacturing the resin composition containing fine paper powder according to claim 1, wherein the raw material contains a compound having a maleic anhydride group from 0.3 to 5 parts by weight.

5. The manufacturing method for manufacturing the resin composition containing fine paper powder according to claim 1, wherein the non-intermeshing type counter-rotating twin-screw kneading extruder further comprises:
a casing having an upstream end portion and a downstream end portion, the two screws being disposed inside the casing;
a material feeding port disposed on the upstream end portion outside of the casing; and
a die connected to the downstream end portion and having an exit therein adjacent to a discharge opening formed in the casing,
wherein the resin composition is mixed and kneaded in the casing by rotation of the two screws while the resin composition is transferred sequentially by the two screws from the upstream end portion to the die that is connected to the downstream end portion, and the resin composition is extruded to the outside from the exit of the die.

* * * * *